Figure 1:
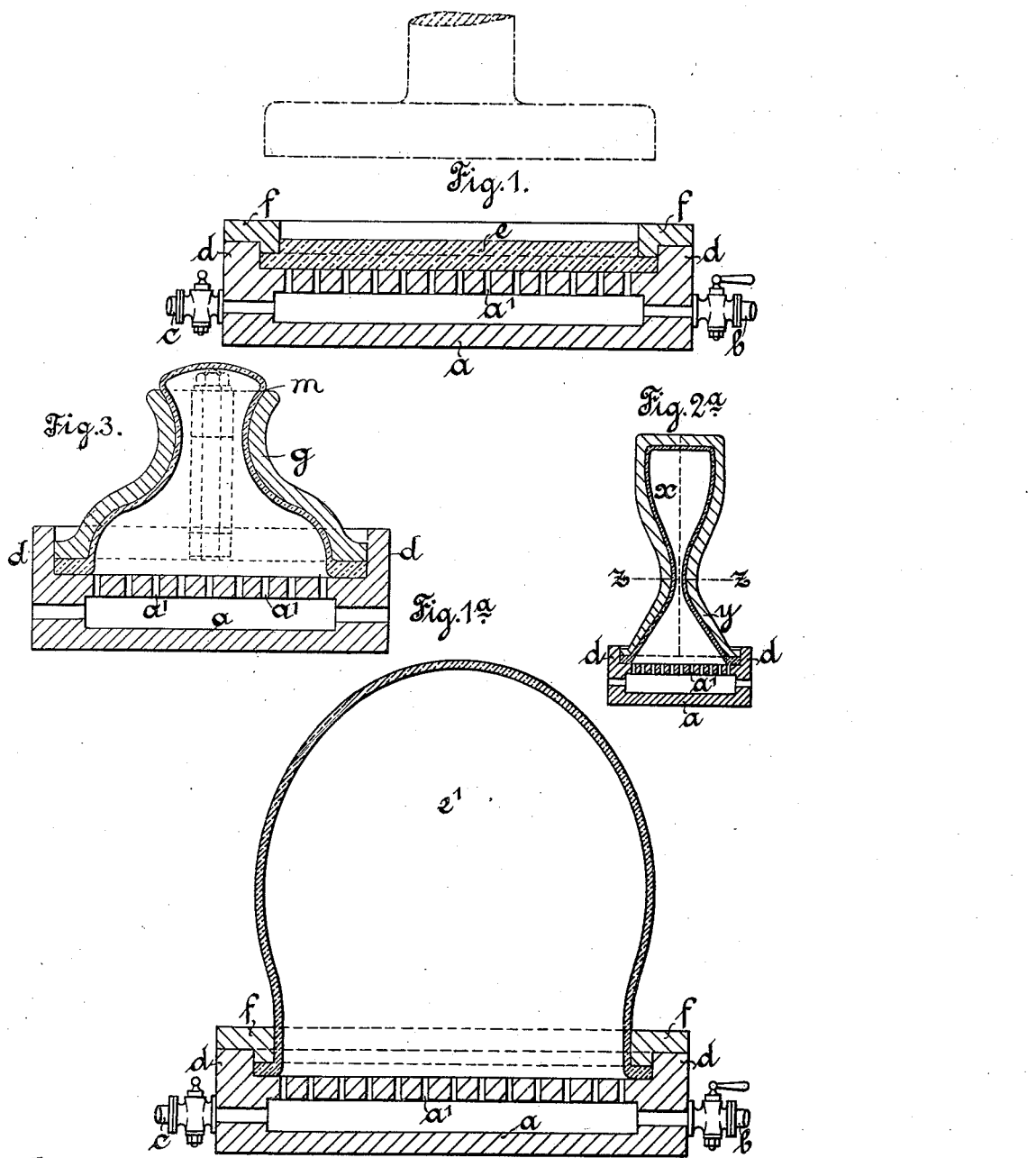

No. 651,059. Patented June 5, 1900.
P. T. SIEVERT.
PROCESS OF MANUFACTURING HOLLOW GLASS ARTICLES.
(Application filed Jan. 31, 1899.)
(No Model.) 4 Sheets—Sheet 1.

No. 651,059. Patented June 5, 1900.
P. T. SIEVERT.
PROCESS OF MANUFACTURING HOLLOW GLASS ARTICLES.
(Application filed Jan. 31, 1899.)
(No Model.) 4 Sheets—Sheet 2.
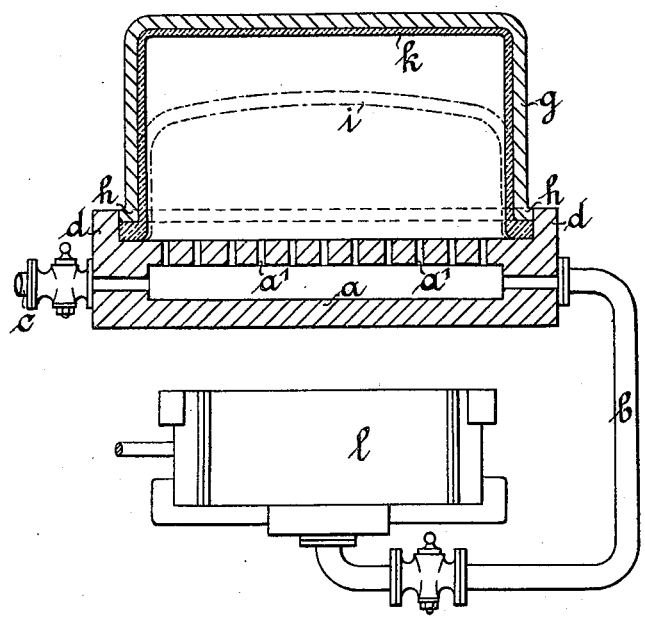
Fig. 2.
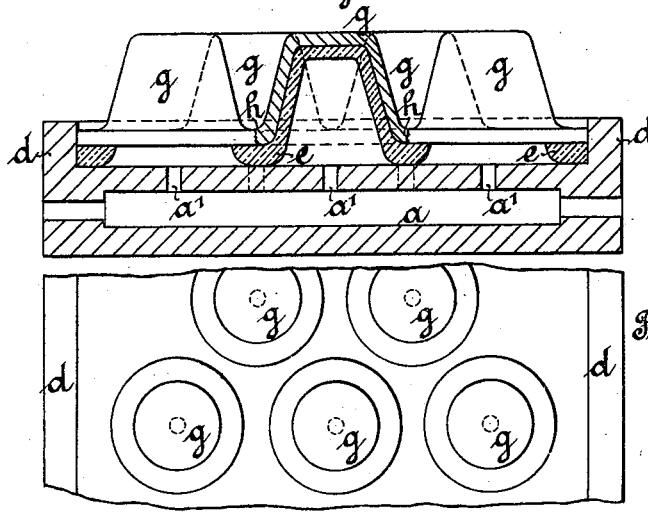
Fig. 4.
Fig. 5.
Witnesses:—
Edward Bieser.
George Barry Jr.
Inventor,
Paul Theodor Sievert
by attorneys
Brown & Seward No. 651,059. Patented June 5, 1900.
P. T. SIEVERT.
PROCESS OF MANUFACTURING HOLLOW GLASS ARTICLES.
(Application filed Jan. 31, 1899.)
(No Model.) 4 Sheets—Sheet 3.
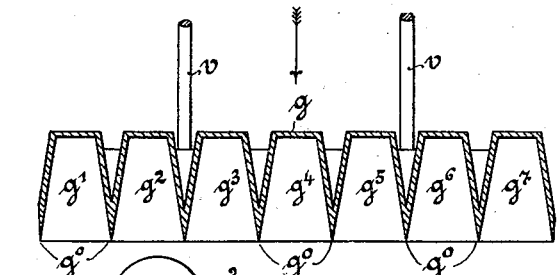
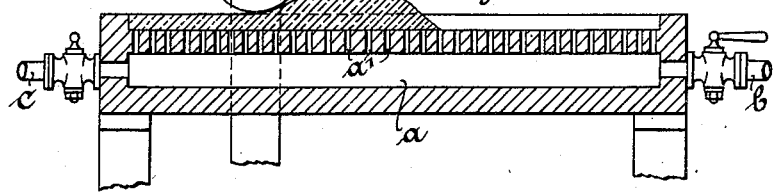
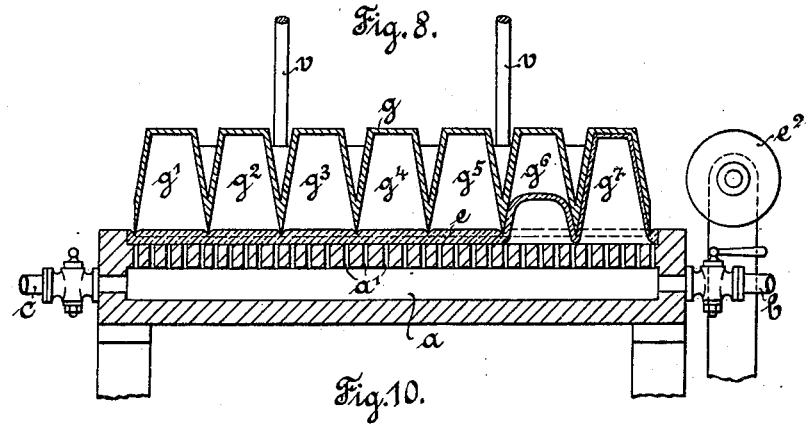
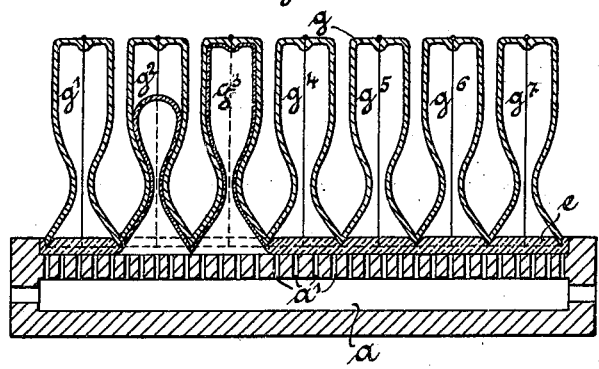
Witnesses:-
Edward Vieser
George Barry Jr.
Inventor:-
Paul Theodor Sievert
by attorneys
Brown & Seward

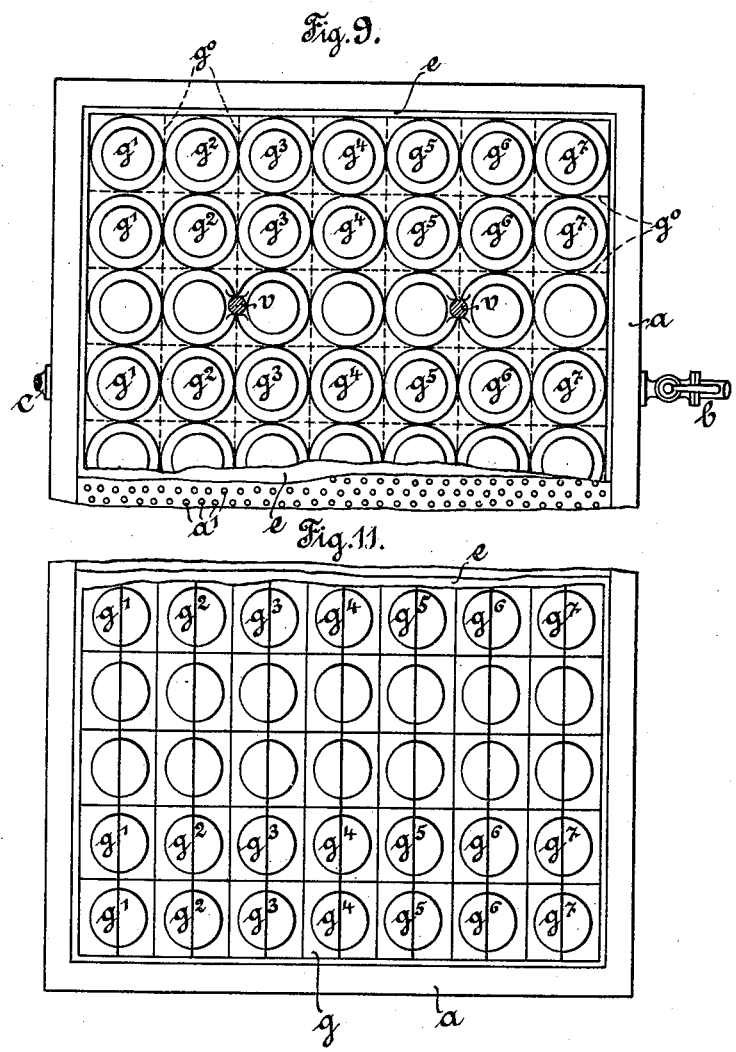

United States Patent Office.

PAUL THEODOR SIEVERT, OF DRESDEN, GERMANY.

PROCESS OF MANUFACTURING HOLLOW GLASS ARTICLES.

SPECIFICATION forming part of Letters Patent No. 651,059, dated June 5, 1900.

Application filed January 31, 1899. Serial No. 704,054. (No specimens.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Processes of Manufacturing Hollow Glass Bodies, of which the following is a specification.

According to this invention a mass of liquid molten glass is spread out on a suitable surface, as a slab or table, into a substantially-uniform layer and held or clamped to said surface in suitable places or along suitable outlines while an elastic-pressure medium applied to one side of the still-liquid or plastic layer blows it out and expands or extends it and makes it assume the desired hollow form. The expansion or extension of the glass layer into a hollow article may take place in the air without any mold or may take place in the cavity of a hollow mold, which gives the hollow glass article a predetermined shape and size.

By the expansion or blowing out of the plastic layer, as above mentioned, into the cavity of a suitable mold any desired hollow glass articles can be made, as boxes, chests, goblets, tumblers, lamp-shades, &c.

According to this process several manufactured articles can be produced in a single operation from a layer of liquid or plastic glass by covering said layer with separate or connected hollow molds, which hold the plastic glass by their edges or borders, and then applying air-pressure to expand the plastic material into separate hollow articles.

The invention is illustrated in the accompanying drawings, in which—

Figure 1 is a central vertical sectional view of an apparatus with a simple perforated plate or slab for the purpose of expanding or inflating the liquid molten glass which has been spread out thereupon for blowing according to my process. Fig. 1ᵃ is a similar view of the same apparatus during the blowing-up of the previously-spread-out molten glass into the form of a bulb in the open air. Figs. 2, 2ᵃ, and 3 are central vertical sectional views of a similar apparatus provided with a single hollow mold into which the spread-out layer of molten glass is to be blown or inflated. Fig. 4 is a central vertical section of a similar apparatus provided with several hollow molds for the simultaneous blowing up of the spread-out molten-glass layer into said molds; Fig. 5, a plan corresponding with Fig. 4; Fig. 6, a vertical sectional view of an apparatus like that shown in Fig. 1, with the addition of an appliance for spreading out the molten-glass layer; Fig. 7, a central vertical sectional view of several hollow molds placed together over the apparatus; Fig. 8, a vertical sectional view of the apparatus represented in Fig. 1, with molds like those shown in Fig. 7 upon the glass layer. Fig. 9 is a plan thereof; Fig. 10, a vertical sectional view of the apparatus shown in Fig. 1 with hollow bottle-molds; Fig. 11, a plan thereof.

Similar letters of reference designate corresponding parts in all the figures.

Referring first to Fig. 1, $a$ is a hollow slab, in communication with the internal cavity of which are an inlet-pipe $b$ and an outlet-pipe $c$, each provided with a cock or valve for the regulation of the tension of an elastic-pressure medium admitted to the internal cavity of the said slab. The upper surface of this hollow slab $a$ is perforated by holes or slots $a'$, and the slab $a$, in connection with the frame $d$, forms a flat chamber for the reception of the liquid-glass layer $e$, which by means of the platen shown by dotted lines or by means of a roller, as will be hereinafter described, can be evened and smoothed on its upper surface and so brought to a substantially-uniform thickness. This evening or smoothing may not be in all cases necessary, as the liquid glass may in some cases be automatically spread into a sufficiently-even layer. On the raised margin $d$ of the slab $a$ which forms a frame there is applied a second frame $f$, a part of which touches or cuts into the glass mass, serving to confine or hold the layer within the boundary-lines of the slab-frame $d$. While the layer of glass remains plastic by reason of its retention of a great portion of the heat by which the glass was liquefied, the expansive medium—air, steam, or gas—which is admitted into the internal cavity of the slab blows up the glass mass within the second frame $f$, and thereby makes a blown-glass body which receives its principal form (cross-section) from the mold of the holding-frame $f$, while the height of this body depends on the duration of the blast or pressure, which can be continued as long as the glass mass suffices to form a hollow glass body.

In Fig. 1$^a$ is shown how a hollow body $e'$ has been formed from the glass layer $e$. Thorough experiments have shown that the wall thickness of the hollow glass objects is the same all over and that this thickness depends on that of the glass layer and on the amount of pressure employed. Experience will soon show each workman how deep the glass layer and how high the pressure must be to produce the desired wall thickness, and he can easily shut off the pressure when the desired height has been attained in order to terminate the operation. In the before-mentioned sample operation the blowing up of the plastic-glass layer takes place in the open air—that is, without the use of a confining-chamber; but for obtaining hollow glass objects of special form a mold $g$, Fig. 2, may be employed inverted and applied to the glass layer, whereby the lower border or edge of the mold replaces or substitutes the holding-frame $f$ of Fig. 1. The lower edge $h$ of the mold holds the glass layer firmly in the outlines of the required objects when these are formed by the blowing-up of the glass layer. The mold $g$ can of course have any desired form. The blowing-up process is shown in Fig. 2 in dotted lines $i$ in an incomplete and in full lines $k$ in a completed state. Here the piping for the expansive medium is shown in connection with a compressing-pump $l$.

Fig. 2$^a$ shows the blowing up of the glass layer into a mold with narrow mouthpiece. In order to get enough of the material of the glass layer for the expansive medium to work on, the glass mold of the object to be made (in this case, for example, a bottle $x$) is provided with a funnel-shaped mouthpiece $y$, the larger diameter of which rests on the glass layer and holds the latter firmly with its margin or border. After separation at the line $z\,z$ there is obtained a hollow article $x$ with a contracted mouth.

Fig. 3 shows an arrangement similar to that in Figs. 1 and 2, only here another form of mold is selected, in which the glass layer is blown up by pressure and in which there is above a perforation $m$ in the mold $g$. This perforation is intended to let the pressure in the mold be relieved by a bursting through of the glass at the place provided therefor when the mold has been filled by the blowing out of the material into a hollow article.

In Figs. 4 and 5 is shown how, according to the process described, the simultaneous manufacture of several objects is accomplished. The mold which is applied to the glass is multiple, containing a number of single molds $g$, (for example, the manufacture of tumblers,) the lower edges $h$ of which hold the glass layer down in circular lines, and those portions of the glass layer which lie within these circles are blown up and fill the separate tumbler-molds. Naturally after the manufacture of the various objects here given as examples the separation of the remaining firmly-held glass mass is best effected by breakage at the point where the blowing of the thin walls begins. To facilitate the removal of the superfluous glass mass from the manufactured articles, the confining-frame $f$ or the lower edges $h$ of the molds $g$ can be sharp-edged or beveled. The sharp edges penetrate the glass layer, but hold it sufficiently firmly and facilitate the removal of the superfluous glass mass.

To effect economy in glass between the molds, the entire glass layer can be covered with single or with connected molds of three, four, or six sides, each mold covering enough of the glass mass as suffices for the manufacture of one hollow article. An example of this is shown in Figs. 7 to 11, inclusive. Figs. 7, 8, and 10 show the molds with sharp edges.

In Fig. 6 there is shown the glass layer $e$ on the perforated upper surface of the hollow slab $a$ spread out and slicked on its upper surface by means of a roller $e^2$. Over the glass layer hangs the vertically-movable mold $g$, Fig. 7, which is held by the stems $v$ and which is formed of a number of molds, (here, for example, for tumblers.) The lower edge of each tumbler-mold terminates in a sharp square $g^0$, and all these squares touch each other, so that when, as in Fig. 8, the mold $g$ is lowered upon the thoroughly-plastic-glass layer $e$ the latter is perfectly covered, as shown in plan in Fig. 9. Each square covers enough glass for the manufacture of the tumbler corresponding to its mold. In the two molds at the right-hand side of Fig. 8 there is shown in one, $g^6$, the commencement of the blowing-out process, in the other, $g^7$, the completion thereof. After the manufacture each tumbler can be taken out of its own mold and by grinding away or by melting of its rim be completed. A similar arrangement is shown by Fig. 10 (vertical section) and Fig. 9, (plan,) in which the compound mold $g$ is formed by a number of single molds $g'\,g^2\,g^3\,g^4\,g^5$ for the manufacture of bottles. The separate molds can be arranged in rows, and each row consists of two parts hinged together. Here also the glass layer is completely covered by the four-sided lower edges of each mold. Each square covers enough glass material for the manufacture of a bottle, and after the formation in each mold by blowing of a glass skin in shape of a bottle the hinged molds are removed a row at a time and opened for the removal of the manufactured hollow glass articles.

The hollow glass bodies blown as hereinabove described may be gradually cooled before they are removed from the plate $a$ by blowing through them a cooling medium. This gradual cooling obviates the necessity of an annealing-oven, with the necessary preparations and precautions. The outlays for wages in this connection and for fuel and the loss by breakage in the usual cooling process are done away with. The simplest cooling medium is atmospheric air, which is forced by a pump or accumulator through the inlet $b$ into the hollow of the slab, whence it reaches the interiors of the blown-glass articles through the perforations $a'$. The perforated metal slab becomes, of course, heated by the layer of melted glass, so that when the glass article has been given its form by the blowing and air is then let in to cool it this air is in its passage through the perforations in the slab warmed, so that it does not exert its cooling action too suddenly. After continued admission of air the metal of the slab cools off and the air reaches the blown-glass articles in a gradually-cooler state until thorough cooling is effected. By this method of cooling the glass articles by gradual lowering of the temperature of the admitted air there is attained an operation which takes place comparatively rapidly and which requires no special transportation of the glass articles and no further apparatus or appliances, heating, or special precautions for this purpose than the already-provided apparatus for blowing the articles into shape. The cavity of the slab having both an inlet and an outlet conduit, the ingress of compressed air into this cavity and its egress therefrom effect sufficient admixture of the hot air already therein with the newly-admitted and gradually-warming air and a draft of the hot air through the hollow glass articles until the said articles cool off.

What I claim as my invention is—

1. The process herein described for the production of hollow glass articles from liquid glass consisting in directly spreading out the liquid glass in a sheet-like flat layer, keeping down the so-spread layer on outlines corresponding with the surrounding outlines of an article to be produced and lifting all those portions of the sheet-like flat layer included within the said outlines by an elastic-pressure medium, thereby transforming the sheet-like flat layer of liquid glass into one or more hollow glass articles at one heating.

2. The continuous process herein described for the production of hollow glass bodies and the subsequent cooling of the said bodies, consisting in first spreading out a liquid-glass mass into a regular layer or plate, next while said layer or plate is held fast along or around certain defined outlines blowing out said layer or plate into a hollow body, and finally, while said layer or plate and the hollow body formed from it remain so held, producing the circulation through the said hollow body of a cooling medium.

In testimony that I claim the foregoing as my invention I have signed my name, in presence of two witnesses, this 14th day of January, 1899.

PAUL THEODOR SIEVERT.

Witnesses:
HERNANDO DE SOTO,
PAUL ARRAS.